(12) United States Patent
Ramamurthy

(10) Patent No.: US 8,819,228 B2
(45) Date of Patent: Aug. 26, 2014

(54) DETECTING THE HEALTH OF AN OPERATING SYSTEM IN VIRTUALIZED AND NON-VIRTUALIZED ENVIRONMENTS

(71) Applicant: American Megatrends, Inc., Norcross, GA (US)

(72) Inventor: Venkatesh Ramamurthy, Hillsboro, OR (US)

(73) Assignee: American Megatrends, Inc., Norcross, GA (US)

( * ) Notice: Subject to any disclaimer, the term of this patent is extended or adjusted under 35 U.S.C. 154(b) by 0 days.

(21) Appl. No.: 13/919,304

(22) Filed: Jun. 17, 2013

(65) Prior Publication Data

US 2013/0283093 A1    Oct. 24, 2013

Related U.S. Application Data

(63) Continuation of application No. 13/462,079, filed on May 2, 2012, now Pat. No. 8,468,242, which is a continuation of application No. 11/756,143, filed on May 31, 2007, now Pat. No. 8,176,168.

(51) Int. Cl.
*G06F 15/173* (2006.01)
(52) U.S. Cl.
USPC ...................................................... 709/224
(58) Field of Classification Search
CPC . G06F 1/3203; G06F 1/3209; G06F 11/2294; H04L 67/125
USPC .................................. 709/223–226; 714/4.1
See application file for complete search history.

(56) References Cited

U.S. PATENT DOCUMENTS

| | | |
|---|---|---|
| 6,813,634 B1 | 11/2004 | Ahmed |
| 7,310,742 B2 | 12/2007 | Zimmer et al. |
| 7,552,213 B2 | 6/2009 | De Oliveira et al. |
| 7,590,710 B1 | 9/2009 | Kokal et al. |
| 7,610,409 B2 | 10/2009 | Huang et al. |
| 7,809,976 B2 | 10/2010 | Goodson et al. |
| 7,853,958 B2 | 12/2010 | Mathew et al. |
| 2003/0196136 A1 | 10/2003 | Haynes et al. |
| 2003/0196148 A1 | 10/2003 | Harrisville-Wolf et al. |
| 2005/0240685 A1 | 10/2005 | Keys |
| 2006/0104292 A1 | 5/2006 | Gupta et al. |
| 2006/0112247 A1 | 5/2006 | Ramany et al. |
| 2006/0206300 A1 | 9/2006 | Garg et al. |
| 2006/0280195 A1 | 12/2006 | Lopez et al. |
| 2007/0027981 A1 | 2/2007 | Coglitore et al. |
| 2007/0050499 A1 | 3/2007 | Atherton et al. |
| 2007/0074192 A1 | 3/2007 | Geisinger |
| 2007/0143753 A1 | 6/2007 | Vasile |
| 2007/0168498 A1 | 7/2007 | Lambert et al. |
| 2008/0077711 A1 | 3/2008 | Cepulis |

*Primary Examiner* — Chirag R Patel
(74) *Attorney, Agent, or Firm* — Morris Manning & Martin, LLP; Tim Tingkang Xia, Esq.

(57) ABSTRACT

A remote management controller is provided for use in conjunction with a managed host computer. The remote management controller exposes a virtual network interface controller, such as a driverless virtual USB network interface controller, to the managed host computer. Through the in-band connection provided by the virtual network interface controller, the remote management controller can send a command to the host operating system or one or more guest operating systems executing in a virtualized environment. If no reply is received to the command, the remote management controller takes corrective action to restore the operation of the host operating system or the non-responsive guest operating systems.

6 Claims, 6 Drawing Sheets

DETECTING THE HEALTH OF AN OPERATING SYSTEM IN VIRTUALIZED AND NON-VIRTUALIZED ENVIRONMENTS

CROSS-REFERENCE TO RELATED APPLICATIONS

This application is a continuation, and claims benefit, of U.S. patent application Ser. No. 13/462,079, filed May 2, 2012, entitled "DETECTING THE HEALTH OF AN OPERATING SYSTEM IN VIRTUALIZED AND NON-VIRTUALIZED ENVIRONMENTS," by Venkatesh Ramamurthy, now issued as U.S. Pat. No. 8,468,242, which itself is a continuation, and claims benefit, of U.S. patent application Ser. No. 11/756,143, filed May 31, 2007, entitled "DETECTING THE HEALTH OF AN OPERATING SYSTEM IN VIRTUALIZED AND NON-VIRTUALIZED ENVIRONMENTS," by Venkatesh Ramamurthy, now issued as U.S. Pat. No. 8,176,168. The above referenced applications are incorporated by reference in their entirety.

BACKGROUND

Remote server management devices allow various aspects of the operation of a server computer to be viewed and controlled from a management application executing on a remotely located computer system. For instance, certain types of remote management devices allow the video output of a managed server computer to be viewed at a remote location. Moreover, these devices typically allow aspects of the operation of the managed server computer to be controlled from the remote location. For instance, a remote management device may be utilized to remotely troubleshoot the operation of a managed server computer and to restart a failed server computer.

Some server management devices provide functionality for detecting the operational health of an operating system executing on the managed server computer. For instance, some server management devices are capable of determining whether the operating system executing on the managed server computer has crashed. Typically, this is accomplished by continually decrementing a hardware watchdog timer register in the server management device, and executing a watchdog timer driver on the host operating system that periodically resets the hardware register. If the hardware register is not reset, this means that the operating system has crashed and, as a result, the server management device performs a reset of the managed server computer.

Although the use of a watchdog timer register and watchdog timer driver does allow a server management device to detect the health of a host operating system, this solution requires the creation and installation of a custom driver for each operating system with which the server management device is utilized. Moreover, when utilized in conjunction with a virtualized server environment where multiple guest operating systems are executed, these types of watchdog timer-based solutions are not capable of detecting the health of each of the guest operating systems independently of the health of the host operating system.

It is with respect to these considerations and others that the various embodiments described below have been made.

SUMMARY

In accordance with the embodiments and implementations described herein, technologies are provided for detecting the operational health of an operating system executing on a managed host computer. Through the implementations presented herein, the operational health of an operating system can be determined by a remote management controller without the use of a hardware watchdog timer register or a watchdog timer driver. Moreover, the implementations presented herein allow a remote management controller to determine the operational health of multiple guest operating systems executing on a managed host computer in a virtualized environment.

Certain aspects of present disclosure are directed to a method for detecting the operational health of a managed host computer. The method includes: exposing, by an out-of-band controller, a virtual network interface controller to the managed host computer such that the virtual network interface controller is assigned a network address in an in-band communication channel to allow that the managed host computer communicates with the out-of-band controller through the in-band communication channel via the virtual network interface controller; transmitting a command from the out-of-band controller to a host operating system executing on the managed host computer through the in-band communication channel via the virtual network interface controller; determining, at the out-of-band controller, if a reply to the transmitted command is received from the host operating system; and restoring the operation of the managed host computer in response to determining that a reply to the transmitted command is not received from the host operating system.

In certain embodiments, the virtual network interface controller includes a virtual universal serial bus (USB) network interface controller. In certain embodiments, the out-of-band controller is a remote management controller. In certain embodiments, the remote management controller is further operative to provide the network address to the virtual network interface controller. In certain embodiments, the command includes an Internet control message protocol (ICMP) echo request or Address Resolution Protocol (ARP) request, and the reply includes an ICMP echo or ARP reply.

Certain aspects of present disclosure are directed to a non-transitory computer storage media having computer-executable instructions stored thereon which, when executed by a computer, cause the computer to perform the method disclosed above.

The subject matter described herein may also be implemented as an apparatus, a computer process, a computing system, or as an article of manufacture such as a computer program product or computer-readable medium. The computer program product may be a computer storage media readable by a computer system and encoding a computer program of instructions for executing a computer process. The computer program product may also be a propagated signal on a carrier readable by a computing system and encoding a computer program of instructions for executing a computer process.

These and various other features as well as advantages will be apparent from a reading of the following detailed description and a review of the associated drawings.

DETAILED DESCRIPTION

Figure 1:
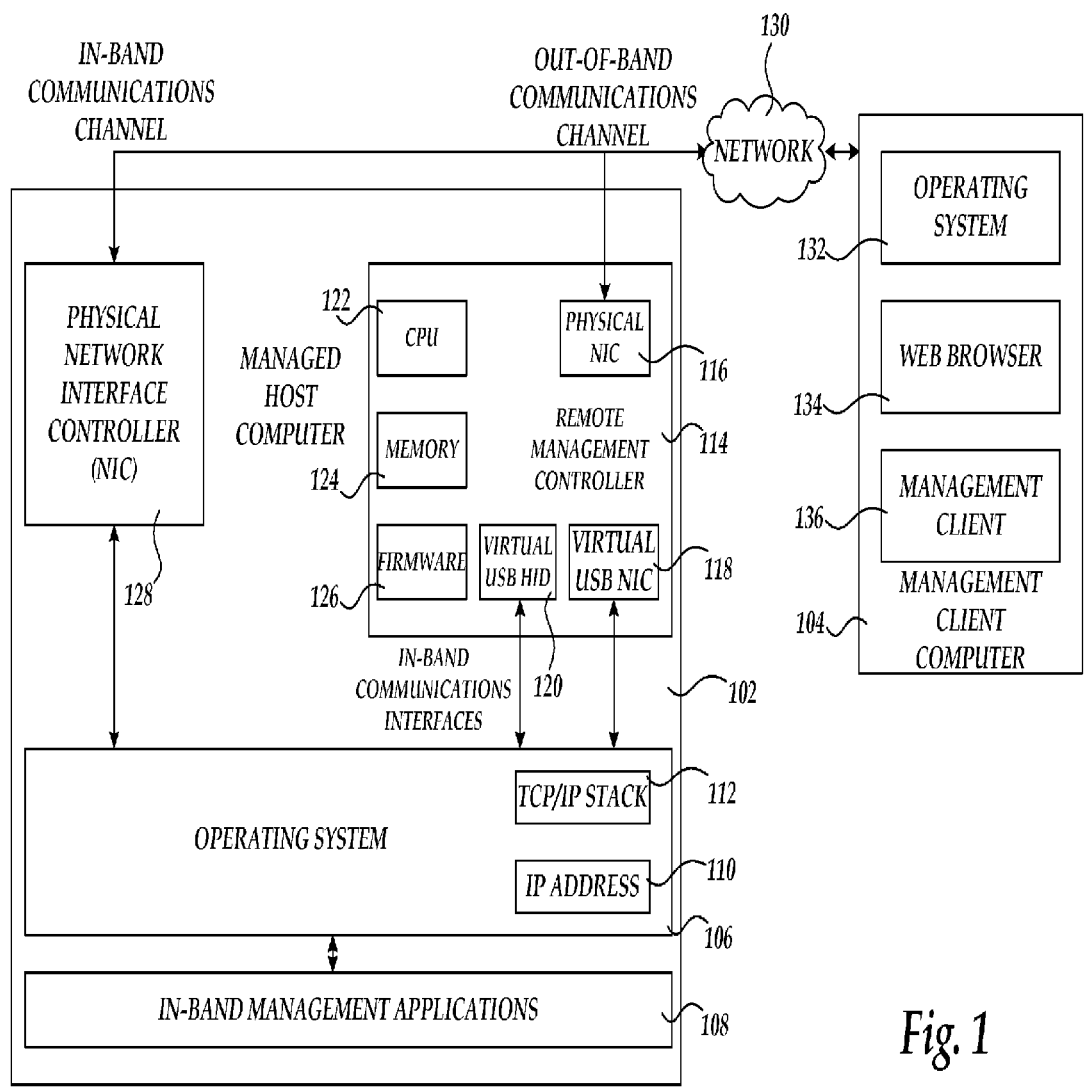
FIG. 1 is a system diagram illustrating aspects of a remote management controller, a managed host computer, and a management client computer that together make up a management system disclosed in the various embodiments presented herein.

Technologies are provided herein for detecting the operational health of a managed host computer in virtualized and non-virtualized operating environments. In the following detailed description, references are made to the accompanying drawings that form a part hereof, and in which are shown by way of illustration specific embodiments or examples. Referring now to the drawings, in which like numerals represent like elements throughout the several figures, aspects of the various implementations provided herein and an exemplary operating environment will be described.

While the technical details are presented herein in the general context of program modules that execute in conjunction with the execution of an operating system, those skilled in the art will recognize that the embodiments may also be implemented in combination with other program modules. Generally, program modules include routines, programs, components, data structures, and other types of structures that perform particular tasks or implement particular abstract data types. Moreover, those skilled in the art will appreciate that the embodiments described herein may be practiced with other computer system configurations, including hand-held devices, multiprocessor systems, microprocessor-based or programmable consumer electronics, minicomputers, mainframe computers, and the like. The embodiments described herein may also be practiced in distributed computing environments where tasks are performed by remote processing devices that are linked through a communications network. In a distributed computing environment, program modules may be located in both local and remote memory storage devices.

Referring now to FIG. 1, aspects of the operation of a remote management controller presented herein will be described. As shown in FIG. 1, a remote management controller 114 is described herein that operates in conjunction with a managed host computer 102. The remote management controller 114 may be integrated with the system board of the managed host computer 102 or may be a daughtercard or other type of add-in card that is installed into the managed host computer 102. Alternatively, the remote management controller 114 may be configured as an external device to the managed host computer 102.

As will be described in greater detail below, the remote management controller 114 provides functionality for remotely managing the operation of the managed host computer 102. In particular, according to implementations, the remote management controller 113 includes a physical network interface controller ("NIC") for establishing a connection to the network 130. Through the network 130, a remotely located management client computer 104 can establish a connection to the remote management controller 116. The management client computer 104 includes an operating system 132 and a management client application 136 for communicating with and controlling the operation of the remote management controller 114. In an alternate embodiment, the remote management controller 114 provides a world wide web ("WWW" or "web") interface through which a web browser application 134 executing on the management client computer 104 may access the functionality provided by the remote management controller 114.

Through the use of the management client 136 or the web browser 134, a remotely located user of the management client computer 104 can access information regarding the health and operation of the managed host computer 102. In this regard, the remote management controller 114 monitors and manages environmental sensors within the managed host computer 102. The remote management controller 114 also maintains appropriate connections to the managed host computer 102 to allow the remote management controller 114 to control the power status of the managed host computer 102. For instance, a remotely located user can utilize the management client 136 or the web browser 134 to power the managed host computer 102 on or off. The remote management controller 114 may receive power directly from the managed host computer 102, from an external power source (to power the operation of the remote management controller 114 when the computer 102 is powered off), or both. These power sources are not illustrated in FIG. 1.

According to implementations, the remote management controller 114 is also operative to redirect the text or video graphics output of the managed host computer 102 to the management client 136 or the web browser 134. In this regard, the remote management controller 114 may receive video display data generated by the managed host computer 102 as input, compress the video display data, and transmit the compressed data to the management client computer 104. The data is decompressed at the management client computer 104 and displayed. Additionally, keyboard and mouse input made at the management client computer 104 may be transmitted to the remote management controller 114 and provided to the managed host computer 102 as if the input were generated locally. In this manner, a remotely located user of the management client computer 104 can control the operation of the managed host computer 102 as if they were proximately located. Appropriate connections between the remote management controller 114 and the managed host computer 102 may be established for these purposes. For instance, the video display output of the managed host computer 102 may be provided to the remote management controller 114. Similarly, the remote management controller 114 may emulate one or more standard USB human interaction devices ("USB HIDs"), such as a keyboard and mouse, in order to provide remotely generated keyboard and mouse data to the managed host computer 102. Because no physical keyboard or mouse is actually provided by the remote management controller 114, the USB HID 120 is referred to as being "virtual."

According to other implementations, the remote management controller 114 may provide mass storage redirection facilities. In this regard, the remote management controller 114 may emulate a USB mass storage device, such as a CD-ROM or DVD-ROM device. From the perspective of the managed host computer 102, a USB mass storage device is physically connected. However, utilizing functionality provided by the remote management controller 114, the emulated mass storage device may be redirected to a physical mass storage device connected to the management client computer 104. In this manner, physical media present at the management client computer 104 appears to be physically present at the managed host computer 102. This functionality may be utilized to perform a remote operating system installation, repair, or upgrade, or to install other types of software on the managed host computer 102.

It should be appreciated that the functionality described herein as being performed by the remote management controller 114 is implemented by way of a firmware 126 stored in a memory 124 of the remote management controller 114. The firmware 126 is executed by a central processing unit 122 on the remote management controller 114. It should also be appreciated that the architecture of the remote management controller 114 shown in FIG. 1 has been simplified and that more or fewer hardware components may be utilized to provide the functionality described herein. The functionality described herein as being provided by the remote management controller 114 is also illustrative and the remote management controller 114 may provide more or fewer functions than those described herein.

Because the management client 136 and web browser 134 can communicate with the remote management controller 114 even when the managed host computer 102 is powered off or unresponsive, the communications channel between the remote management controller 114 and the management client computer 104 is referred to herein as being "out-of-band." Out-of-band management is essential for determining the health of the managed host computer 102 prior to an operating system 106 being booted by the managed host computer 102 or when the operating system 106 has crashed. Out-of-band management is also useful for configuring the operation of a basic input/output system ("BIOS") of the managed host computer 102.

It should be appreciated that the managed host computer 102 may also be managed through an "in-band" communications channel. In this regard, the managed host computer 102 includes a physical NIC 128 through which a management client application 136 may establish a connection with the managed host computer 102. Through this in-band communications channel, communications may be made with one or more in-band management applications 108 executing on the operating system 106. Because the operating system 106 must be executing to enable communication with the in-band management applications 108, this type of management is referred to herein as "in-band" management. The in-band management applications 108 may include such management applications as the Systems Management Architecture for Server Hardware ("SMASH") and Web Services Management ("WS-MAN"). Other in-band management applications may be utilized in a similar manner.

According to implementations presented herein, the remote management controller 114 includes a mechanism by which access may be had to the in-band management applications 108 through an out-of-band communications channel. In particular, according to one implementation, the remote management controller 114 is operative to expose a virtual network interface controller 118 to the managed host computer 102. From the perspective of the managed host computer 102, it appears as if a physical network interface controller 118 has been connected. The functionality of the network interface controller 118 is, however, provided by the remote management controller 114 and it is therefore described herein as being "virtual."

According to one implementation, the virtual network interface controller 118 comprises a standard driverless USB Ethernet adapter. Because the virtual NIC 118 is a standard USB NIC in this implementation, no custom drivers need to be loaded by the operating system 106 in order to utilize the functionality provided thereby. The remote management controller 114 appears to the operating system 106 as a standard networking device and, therefore, a standard TCP/IP stack 112 and standard networking commands can be utilized to communicate with the remote management controller 114. In this regard, therefore, it should be appreciated that the virtual USB NIC 118 exposed by the remote management controller 114 provides an in-band communications channel through which the remote management controller 114 can communicate with the in-band management applications 108 and through which the operating system 106 and the in-band management applications 108 can communicate with the remote management controller 114. Through this in-band communications channel, the operating system 106 and the in-band management applications 108 also have access to the out-of-band communications network established with the management client computer 104.

It should be appreciated that, according to embodiments, the remote management controller 114 may be further equipped with a dynamic host configuration protocol ("DHCP") server. Through the DHCP server, the operating system 106 can request a network address, such as an Internet protocol ("IP") address 110, for the virtual USB NIC 118. In response to such a request, the DHCP server assigns an appropriate network address to the virtual USB NIC 118. The DHCP server is not illustrated in FIG. 1. As will be described in greater detail below, the DHCP server provided by the firmware 126 of the remote management controller 114 may also provide network addresses to virtual NICs exposed to guest operating systems executing on the managed host computer 102 in a virtualized environment.

Figure 2:
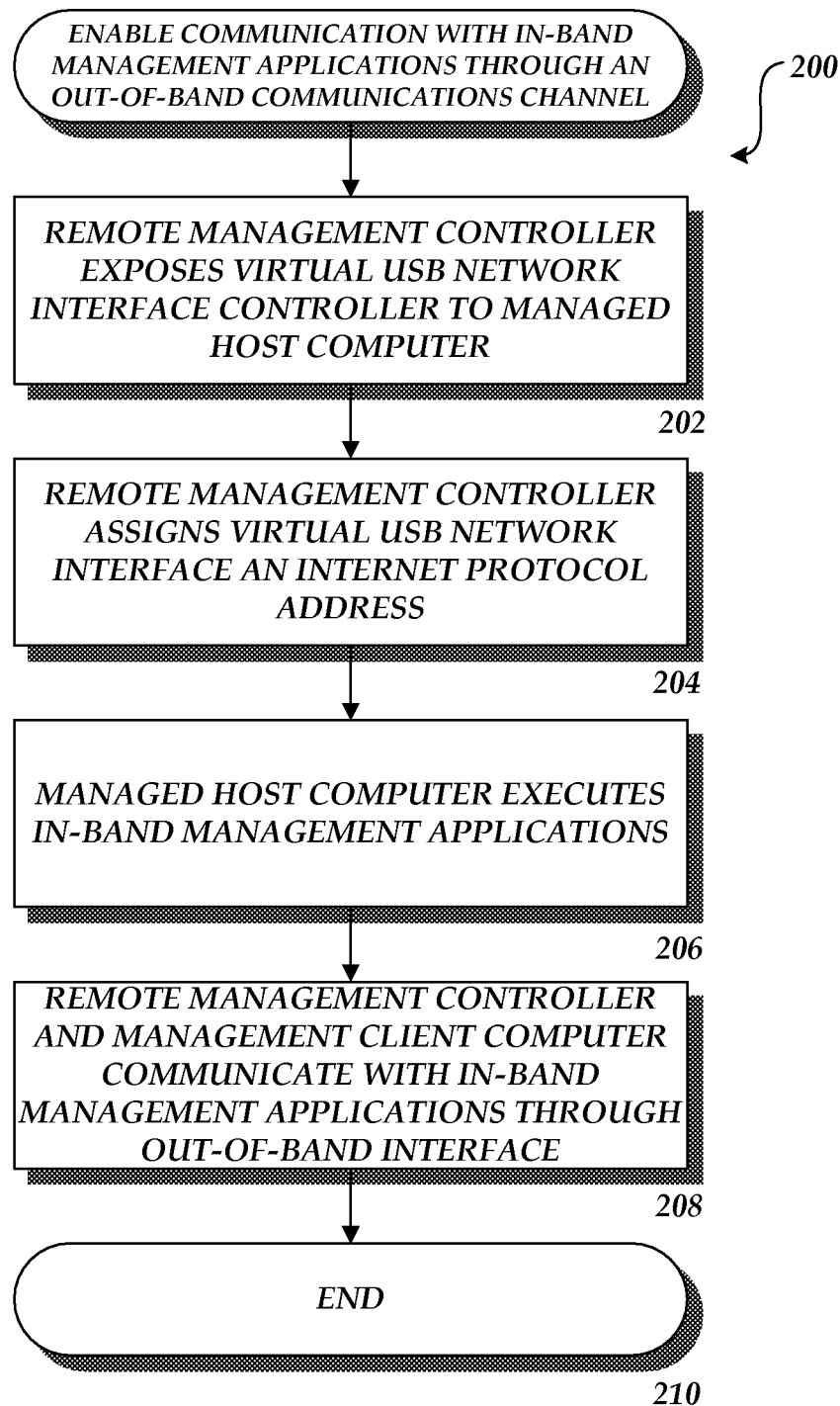
FIG. 2 is a flow diagram showing an illustrative process for enabling communication with an in-band management application over an out-of-band communications channel according to one implementation presented herein.

Referring now to FIG. 2, an illustrative routine 200 will be described in detail illustrating the operation of the remote management controller 114 with respect to providing an out-of-band communications channel for communicating with the in-band management applications 108 executing on the managed host computer 102. The logical operations of the various implementations presented herein are implemented (1) as a sequence of computer implemented acts or program modules running on a computing system and/or (2) as interconnected machine logic circuits or circuit modules within the computing system. The implementation is a matter of choice dependent on the performance requirements of the computing system on which the embodiments described herein are implemented. Accordingly, the logical operations making up the implementations described herein are referred to variously as operations, structural devices, acts or modules. It will be recognized by one skilled in the art that these operations, structural devices, acts and modules may be implemented in software, in firmware, in special purpose digital logic, and any combination thereof without deviating from the spirit and scope of the present invention as recited within the claims attached hereto.

The routine 200 begins at operation 202, where the remote management controller 114 exposes the virtual USB NIC 118 to the managed host computer 102. As discussed above, the operating system 106 can configure the virtual USB NIC 118 for use without the use of special drivers or other dynamically linked libraries. As a part of the configuration process for the virtual USB NIC 118, the operating system 106 may utilized DHCP to request a network address for the virtual USB NIC 118. As discussed above, the remote management controller 114 may be equipped with a DHCP server for assigning and appropriate IP address in response to such a request. Once the virtual USB NIC 118 has been assigned an IP address, the virtual USB NIC 118 is ready for communication. This occurs at operation 204.

From operation 204, the routine 200 continues to operation 206, where the managed host computer 102 executes the in-band management applications 108. The routine 200 then continues to operation 208, where the remote management controller 114 communicates with the in-band management applications 108 through the in-band communications interface provided by the virtual USB NIC 118. As described above, the management client 136 may also communicate over the out-of-band communications channel with the in-band management applications in a similar manner. The operating system 106 and the in-band management applications 108 may also utilize the in-band communications interface provided by the virtual USB NIC 118 to communicate with the remote management controller 114. In another implementation, an application executing on the managed host computer 102 may utilize the in-band communications channel provided by the virtual USB NIC 118 to configure the operation of the remote management controller 114. From operation 208, the routine 200 continues to operation 210, where it ends.

Figure 3:
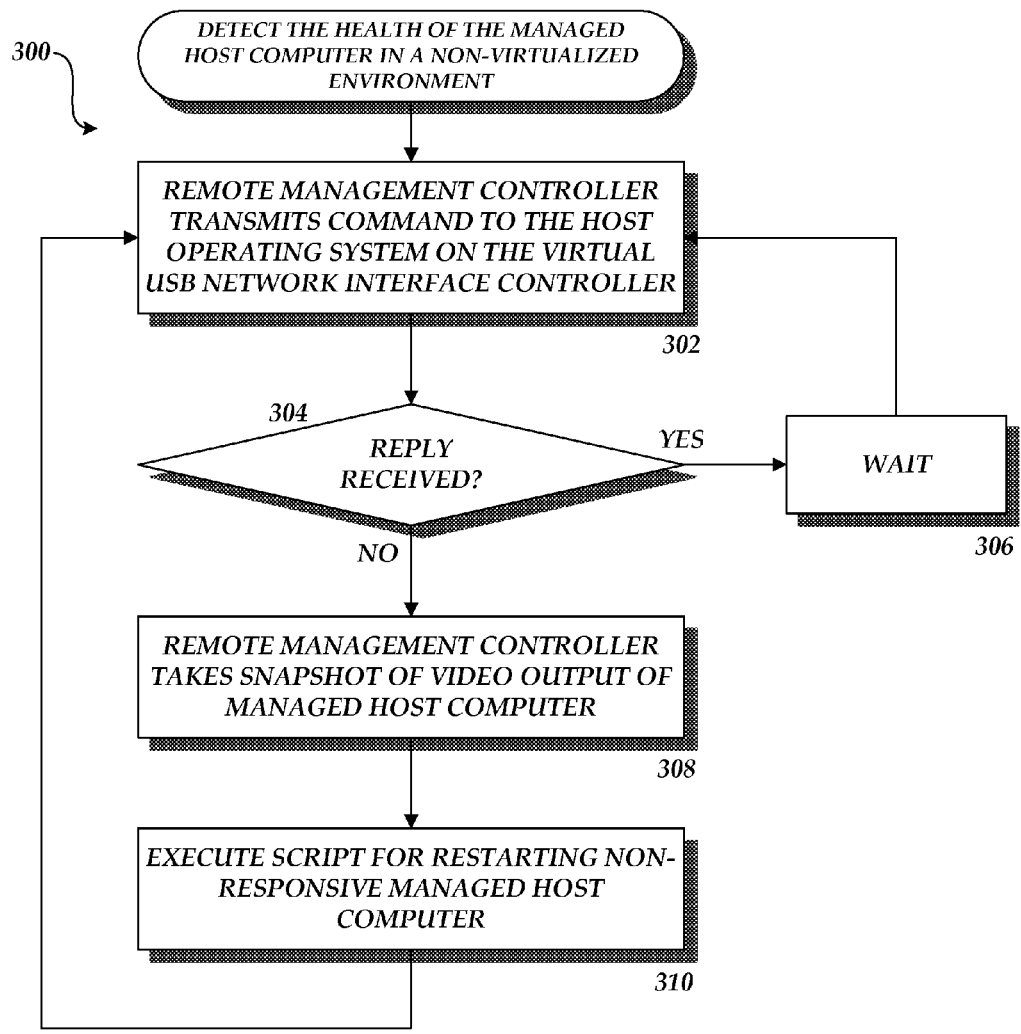
FIG. 3 is a flow diagram showing an illustrative process for determining the health of a host operating system in a non-virtualized environment according to one implementation presented herein.

Referring now to FIG. 3, an illustrative routine 300 will be described for detecting the operational health of the managed host computer 102 in a non-virtualized environment, such as that shown in FIG. 1 and described above. The routine 300 begins at operation 302, where the remote management controller 114 transmits a command to the operating system 106 executing on the managed host computer 102 via the network connection established using the virtual USB NIC 118. In one implementation, the command comprises an ICMP echo request command. Once the command has been issued, the routine 300 continues from operation 302 to operation 304.

At operation 304, the remote management controller 114 determines whether a reply was received to the transmitted command. Where the command is an ICMP echo request command, the reply will take the form of an ICMP echo reply. If a reply is received, the routine 300 branches from operation 304 to operation 304, where it waits a predetermined period of time before returning to operation 302 and transmitting another command. If a reply is not received, the routine 300 proceeds from operation 304 to operation 308.

If the operating system 106 does not reply to the command, the remote management controller 114 takes corrective action to restore the operation of the operating system 106 executing on the managed host computer 102. For instance, in one implementation, the remote management controller 114 captures the screen display currently being output by the managed host computer 102. The remote management controller 114 may also transmit the captured data to a system administrator for use in determining the cause of the failure of the managed server computer 102. This occurs at operation 308.

The remote management controller 114 may also take other types of corrective action, such as executing a script or other type of program to restart the operation of the managed host computer 102. In this manner, the remote management controller 114 can cause the managed host computer 102 to reset itself and reload the operating system 106. This occurs at operation 310. Once the corrective action has been performed, the routine 300 returns to operation 302, where the processing described above is repeated.

Figure 4:
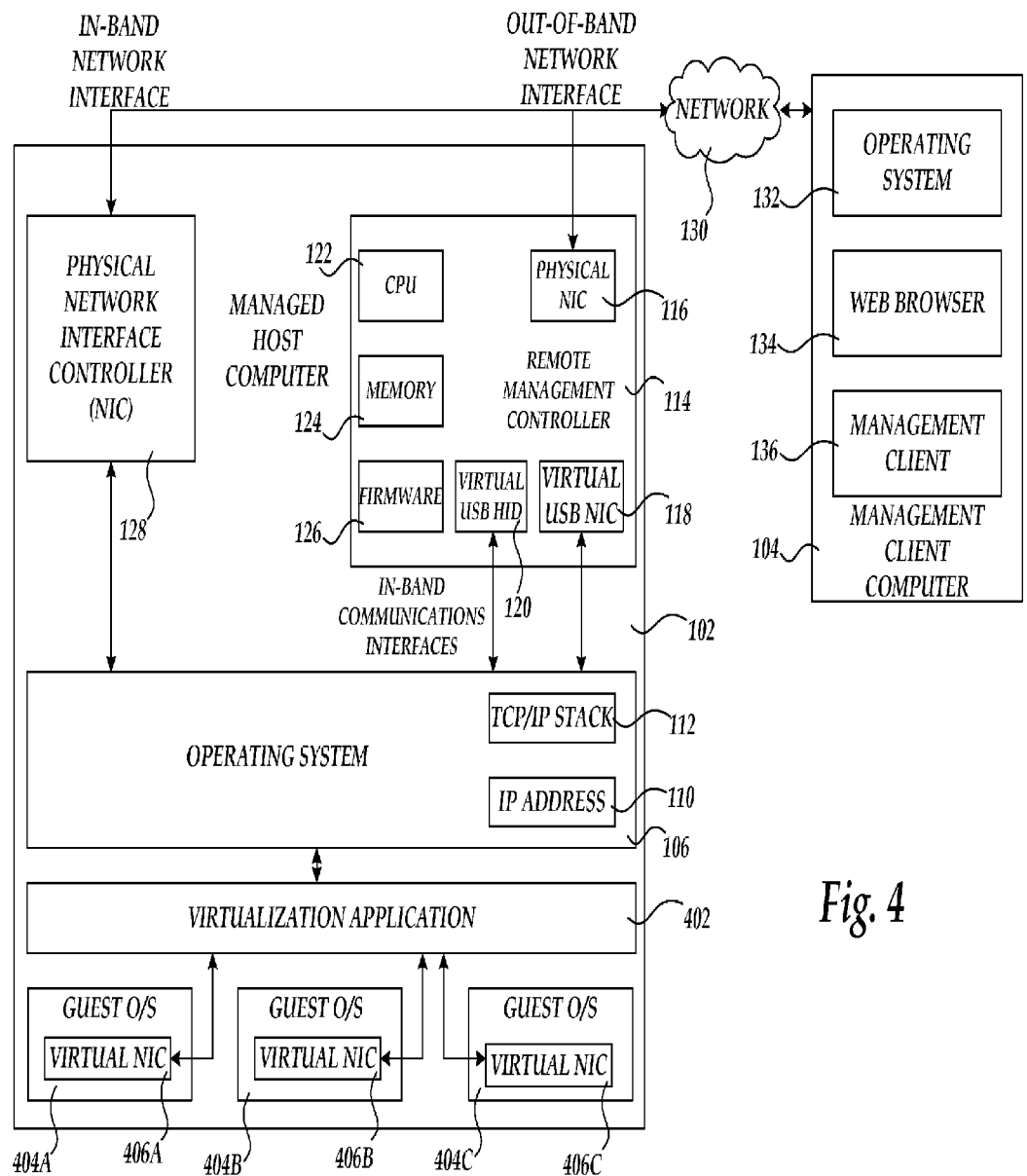
FIG. 4 is a system diagram illustrating additional aspects of a managed host computer in a virtualized environment that forms an operating environment for one implementation presented herein.

Turning now to FIG. 4, additional details will be provided regarding an embodiment presented herein for determining the operational health of one or more guest operating systems executing on the managed host computer 102 in a virtualized environment. In a virtualized environment such as the one shown in FIG. 4, a virtualization application 402 executing on the host operation system 106 provides functionality for executing multiple guest operating systems 404A-404C. The virtualization application 402 decouples the execution of each guest operating system 404A-404C from the actual hardware of the managed host computer 102 by exposing virtual hardware to each guest operating system 404A-404C. In this manner, each guest operating system 404A-404C is executed against its own virtual computer hardware. The virtual hardware exposed by the virtualization application to each guest operating system 404A-404C includes a virtual NIC 406A-406C. Examples of virtualization applications include the VMWARE SERVER virtualization application from VMWARE CORPORATION of Palo Alto, Calif. and the VIRTUAL PC virtualization application from MICROSOFT CORPORATION of Redmond, Wash.

According to embodiments, the virtual NICs 406A-406C exposed to each guest operating system 404A-404C, respectively, are bridged to the network interface provided by the virtual NIC 118 exposed to the managed host computer 102 by the remote management controller 114. In this manner, an in-band network connection can be established between the remote management controller 114 and each of the guest operating systems 404A-404C executing on the managed host computer 102. In this regard, the DHCP server provided by the remote management controller is operative to provide a network address to each of the virtual NICs 406A-406C exposed to the guest operating systems 404A-404C. As will be described in greater detail below with respect to FIG. 5, the in-band network connection between the remote management controller 114 and each of the guest operating systems 404A-404C can be utilized to assist in determining the operational health of each of the guest operating systems 404A-404C.

Figure 5:
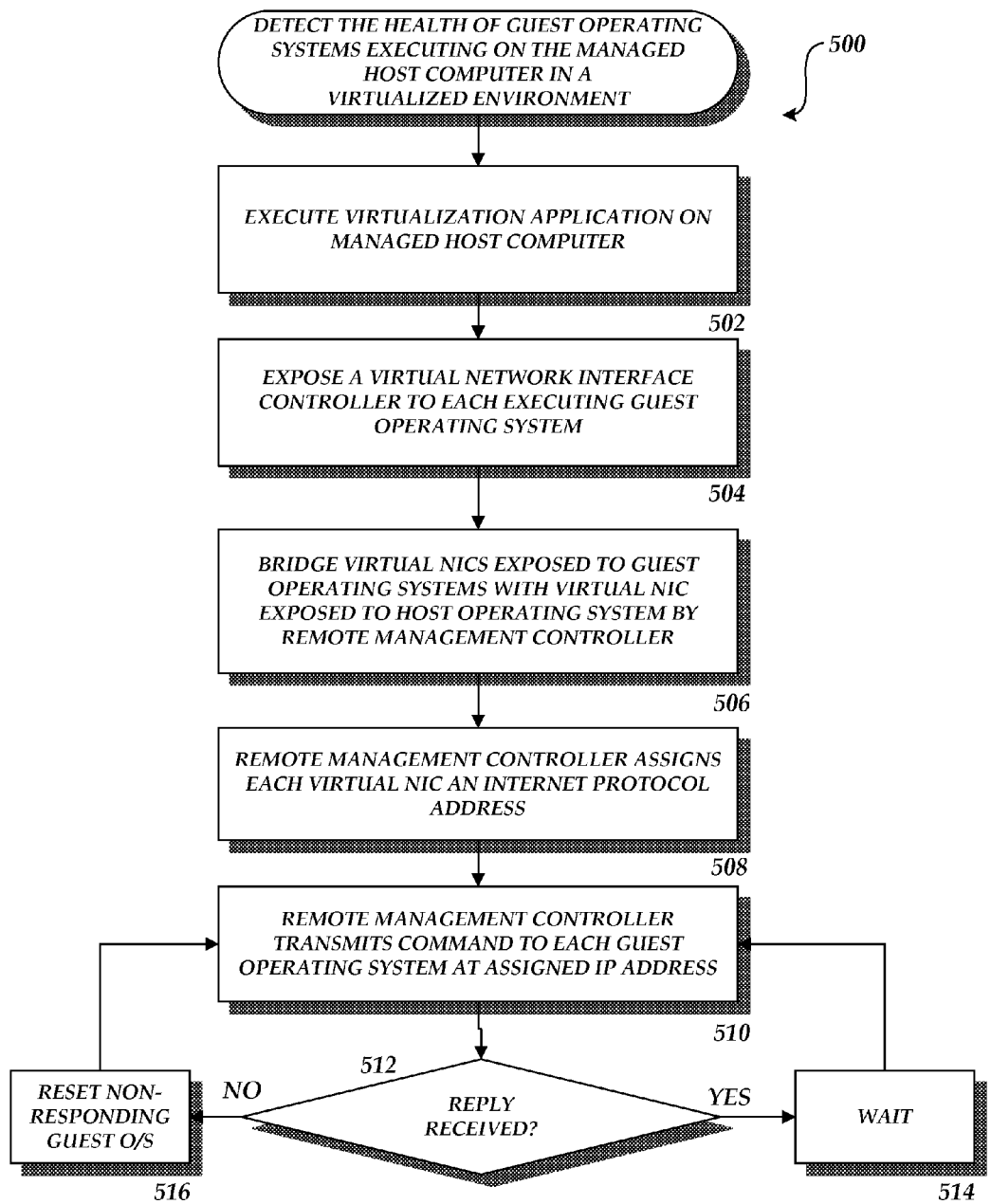
FIG. 5 is a flow diagram showing an illustrative process for determining the health of a host operating system and multiple guest operating systems executing in a virtualized environment according to one implementation presented herein.

Referring now to FIG. 5, an illustrative routine 500 will be described for detecting the health of the guest operating systems 404A-404C executing on the managed host computer 102. In particular, the routine 500 begins at operation 502, where the virtualization application 106 is executed on the managed host computer 102. As discussed above, the virtualization application 106 provides facilities for executing one or more guest operating systems 404A-404C, including the abstraction of the hardware upon which the guest operating systems 404A-404C are executed. In this regard, the virtualization application 402 is operative to expose a virtual NIC 406A-406C, respectively, to each of the guest operating systems 404A-404C. This occurs at operation 504.

As also discussed briefly above, the virtualization application 402 also provides functionality for bridging the virtual NICs 406A-406C to the virtual USB NIC 118. In this manner, a network connection is created between the remote management controller 114 and each of the guest operating systems 404A-404C. This occurs at operation 506. Once the network connections have been established between the remote management controller 114 and each of the guest operating systems 404A-404C, the routine 500 continues to operation 508. At operation 508, the DHCP server within the remote management controller 114 assigns a network address to each of the virtual NICs 406A-406C.

From operation 508, the routine 500 continues to operation 510, where the remote management controller 114 transmits a command, such as an ICMP echo request command, to each of the guest operating systems 404A-404C. Once the command has been issued, the routine 500 continues from operation 510 to operation 512. At operation 512, the remote management controller 114 determines whether a reply was received to the transmitted command from each of the guest operating systems 404A-404C. Where the command is an ICMP echo request command, the reply will take the form of an ICMP echo reply. If a reply is received from each guest operating system, the routine 500 branches from operation 512 to operation 514, where the remote management controller 114 waits before transmitting another command. If a reply is not received from one of the guest operating systems 404A-404C, the routine 500 proceeds from operation 512 to operation 516.

If one of the guest operating systems does not reply to the command, the remote management controller 114 takes corrective action to restore the operation of the non-responsive guest operating system at operation 516. As discussed above, the corrective action may comprise executing a script or other type of program, transmitting a notification to a system administrator, or performing another type of function. Once the corrective action has been performed, the routine 500 returns to operation 510, where the processing described above is repeated.

Figure 6:
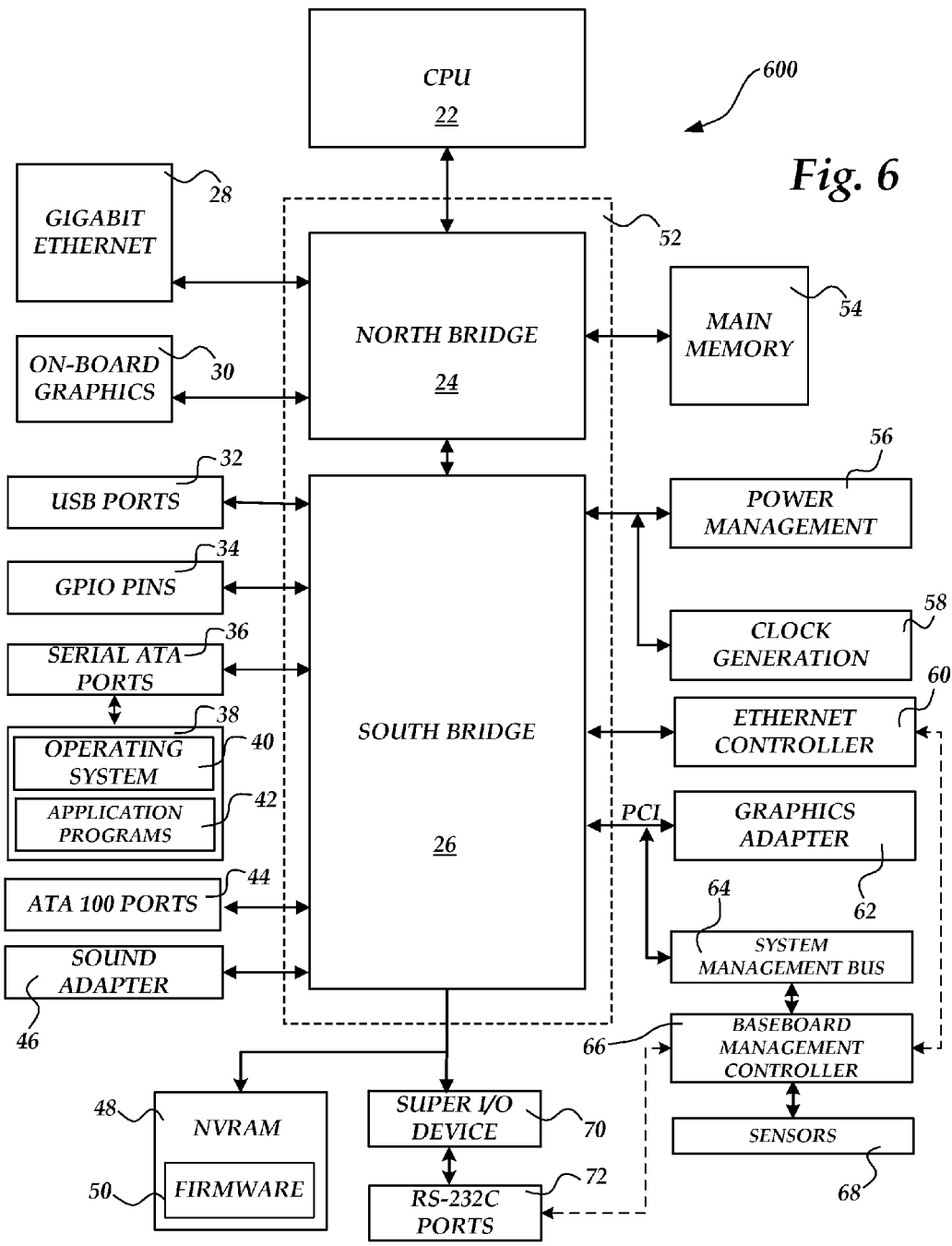
FIG. 6 is a computer architecture diagram that illustrates a computer architecture that may be utilized by the various computing systems described herein.

Turning now to FIG. 6, an illustrative computer architecture for the various computing systems utilized in the embodiments described herein will be provided. It should be appreciated that although the embodiments described herein are discussed in the context of server computers, virtually any type of computing device may be utilized. It should be appreciated that the architecture shown in FIG. 6 may be utilized to embody the managed host computer 102, the management client computer 104, or any of the other computer systems described herein.

The illustrative architecture shown in FIG. 6 is for a computer 600 that includes a baseboard, or "motherboard", which is a printed circuit board to which a multitude of components or devices may be connected by way of a system bus or other electrical communication path. In one illustrative embodiment, a CPU 22 operates in conjunction with a chipset 52. The CPU 22 is a standard central processor that performs arithmetic and logical operations necessary for the operation of the computer. The computer 2 may include a multitude of CPUs 22.

The chipset 52 includes a north bridge 24 and a south bridge 26. The north bridge 24 provides an interface between the CPU 22 and the remainder of the computer 600. The north bridge 24 also provides an interface to a random access memory ("RAM") used as the main memory 54 in the computer 600 and, possibly, to an on-board graphics adapter 30. The north bridge 24 may also include functionality for providing networking functionality through a gigabit Ethernet adapter 28. The gigabit Ethernet adapter 28 is capable of connecting the computer 600 to another computer via a network. Connections which may be made by the network adapter 28 may include LAN or WAN connections. LAN and WAN networking environments are commonplace in offices, enterprise-wide computer networks, intranets, and the Internet. The north bridge 24 is connected to the south bridge 26.

The south bridge 26 is responsible for controlling many of the input/output functions of the computer 600. In particular, the south bridge 26 may provide one or more universal serial bus ("USB") ports 32, a sound adapter 46, an Ethernet controller 60, and one or more general purpose input/output ("GPIO") pins 34. The south bridge 26 may also provide a bus for interfacing peripheral card devices such as a graphics adapter 62. In one embodiment, the bus comprises a peripheral component interconnect ("PCI") bus. The south bridge 26 may also provide a system management bus 64 for use in managing the various components of the computer 600. Additional details regarding the operation of the system management bus 64 and its connected components are provided below.

The south bridge 26 is also operative to provide one or more interfaces for connecting mass storage devices to the computer 600. For instance, according to an embodiment, the south bridge 26 includes a serial advanced technology attachment ("SATA") adapter for providing one or more serial ATA ports 36 and an ATA 100 adapter for providing one or more ATA 100 ports 44. The serial ATA ports 36 and the ATA 100 ports 44 may be, in turn, connected to one or more mass storage devices storing an operating system 40 and application programs 42, such as the SATA disk drive 38. As known to those skilled in the art, an operating system 40 comprises a set of programs that control operations of a computer and allocation of resources. An application program is software that runs on top of the operating system software, or other runtime environment, and uses computer resources to perform application specific tasks desired by the user.

The mass storage devices connected to the south bridge 26, and their associated computer-readable media, provide non-volatile storage for the computer 600. Although the description of computer-readable media contained herein refers to a mass storage device, such as a hard disk or CD-ROM drive, it should be appreciated by those skilled in the art that computer-readable media can be any available media that can be accessed by the computer 600. By way of example, and not limitation, computer-readable media may comprise computer storage media and communication media. Computer storage media includes volatile and non-volatile, removable and non-removable media implemented in any method or technology for storage of information such as computer-readable instructions, data structures, program modules or other data. Computer storage media includes, but is not limited to, RAM, ROM, EPROM, EEPROM, flash memory or other solid state memory technology, CD-ROM, DVD, HD-DVD, BLU-RAY, or other optical storage, magnetic cassettes, magnetic tape, magnetic disk storage or other magnetic storage devices, or any other medium which can be used to store the desired information and which can be accessed by the computer.

A low pin count ("LPC") interface may also be provided by the south bridge 6 for connecting a "Super I/O" device 70. The Super I/O device 70 is responsible for providing a number of input/output ports, including a keyboard port, a mouse port, a serial interface 72, a parallel port, and other types of input/output ports. The LPC interface may also connect a computer storage media such as a ROM or a flash memory such as a NVRAM 48 for storing the firmware 50 that includes program code containing the basic routines that help to start up the computer 600 and to transfer information between elements within the computer 600.

As described briefly above, the south bridge 26 may include a system management bus 64. The system management bus 64 may include a BMC 66. In general, the BMC 66 is a microcontroller that monitors operation of the computer system 600. In a more specific embodiment, the BMC 66 monitors health-related aspects associated with the computer system 600, such as, but not limited to, the temperature of one or more components of the computer system 600, speed of rotational components (e.g., spindle motor, CPU Fan, etc.) within the system, the voltage across or applied to one or more components within the system 600, and the available or used capacity of memory devices within the system 600. To accomplish these monitoring functions, the BMC 66 is communicatively connected to one or more components by way of the management bus 64. In an embodiment, these components include sensor devices for measuring various operating and performance-related parameters within the computer system 600.

The management bus 64 is used by the BMC 66 to request and/or receive various operating and performance-related parameters from one or more components, which are also communicatively connected to the management bus 64. For instance, in one embodiment, the management bus 64 may communicatively connects the BMC 66 to a CPU temperature sensor and a CPU fan (not shown in FIG. 6), thereby providing a means for the BMC 66 to monitor and/or control operation of these components. The BMC 66 may also include sensors 68 connected directly thereto. The serial ports 72 and the Ethernet controller 60 may be utilized to establish a connection with the BMC 66.

It should be appreciated that the computer 600 may comprise other types of computing devices, including hand-held computers, embedded computer systems, personal digital assistants, and other types of computing devices known to those skilled in the art. It is also contemplated that the computer 600 may not include all of the components shown in FIG. 6, may include other components that are not explicitly shown in FIG. 6, or may utilize an architecture completely different than that shown in FIG. 6.

Based on the foregoing, it should be appreciated that embodiments described herein provide technologies for detecting the operational health of an operating system in a virtualized or non-virtualized operating environment. Moreover, although the embodiments described herein have been described in language specific to computer structural features, methodological acts and by computer readable media, it is to be understood that the invention defined in the appended claims is not necessarily limited to the specific structures, acts or media described. Therefore, the specific structural features, acts and mediums are disclosed as exemplary embodiments implementing the claimed invention.

The various embodiments described above are provided by way of illustration only and should not be construed to limit the invention. Those skilled in the art will readily recognize various modifications and changes that may be made to the present invention without following the example embodiments and applications illustrated and described herein, and without departing from the true spirit and scope of the present invention, which is set forth in the following claims.

I claim:

1. A method for detecting the operational health of a managed host computer, the method comprising:

configuring, by an out-of-band controller, a physical network interface controller located at the out-of-band controller to enable communication between the out-of-band controller and a management client computer through an out-of-band communications channel via the physical network interface controller;

exposing, by the out-of-band controller, a virtual network interface controller to the managed host computer such that the virtual network interface controller is assigned a network address in an in-band communication channel to allow that the managed host computer communicates with the out-of-band controller through the in-band communication channel via the virtual network interface controller, wherein the virtual network interface controller is communicatively connected to the physical network interface controller of the out-of-band controller through a controller communication path, wherein the management client computer and the managed host computer are in communication through a path comprising the in-band communication channel, the controller communication path, and the out-of-band channel;

transmitting a command from the out-of-band controller to a host operating system executing on the managed host computer through the in-band communication channel via the virtual network interface controller;

determining, at the out-of-band controller, if a reply to the transmitted command is received from the host operating system through the in-band communication channel via the virtual network interface controller; and restoring the operation of the managed host computer in response to determining that a reply to the transmitted command is not received from the host operating system.

2. The method of claim 1, wherein the virtual network interface controller comprises a virtual universal serial bus (USB) network interface controller.

3. The method of claim 1, wherein the out-of-band controller is a remote management controller.

4. The method of claim 3, wherein the remote management controller is further operative to provide the network address to the virtual network interface controller.

5. The method of claim 4, wherein the command comprises an Internet control message protocol (ICMP) echo request or Address Resolution Protocol (ARP) request and wherein the reply comprises an ICMP echo or ARP reply.

6. A non-transitory computer storage media having computer-executable instructions stored thereon which, when executed by a computer, cause the computer to perform the method of claim 1.

* * * * *